United States Patent
Xu et al.

(10) Patent No.: US 9,832,689 B2
(45) Date of Patent: Nov. 28, 2017

(54) CELL HANDOVER METHOD, BASE STATION AND SYSTEM

(71) Applicant: HUAWEI TECHNOLOGIES CO., LTD., Shenzhen, Guangdong (CN)

(72) Inventors: Li Xu, Chengdu (CN); Jianshe Dai, Chengdu (CN); Anquan Yang, Chengdu (CN); Jian Zhang, Chengdu (CN); Zilong Gu, Chengdu (CN); Qingwen Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/348,258

(22) Filed: Nov. 10, 2016

(65) Prior Publication Data
US 2017/0064587 A1  Mar. 2, 2017

Related U.S. Application Data

(63) Continuation of application No. PCT/CN2014/082068, filed on Jul. 11, 2014.

(51) Int. Cl.
*H04W 36/00* (2009.01)
*H04W 92/20* (2009.01)

(52) U.S. Cl.
CPC ... *H04W 36/0055* (2013.01); *H04W 36/0094* (2013.01); *H04W 92/20* (2013.01)

(58) Field of Classification Search
CPC .............. H04W 36/0055; H04W 36/0094
See application file for complete search history.

(56) References Cited

U.S. PATENT DOCUMENTS

| | | |
|---|---|---|
| 2007/0042784 A1 | 2/2007 | Anderson |
| 2007/0298802 A1 | 12/2007 | Kaminski |
| 2008/0108354 A1 | 5/2008 | Nagata |
| 2008/0318573 A1* | 12/2008 | Kaminski ............. H04W 36/02 455/436 |
| 2009/0028112 A1 | 1/2009 | Attar et al. |

(Continued)

FOREIGN PATENT DOCUMENTS

| | | |
|---|---|---|
| CN | 103024831 A | 4/2013 |
| CN | 103026753 A | 4/2013 |

(Continued)

OTHER PUBLICATIONS

International Search Report, dated Apr. 20, 2015, in corresponding International Application No. PCT/CN2014/082068 (4 pp.).

(Continued)

*Primary Examiner* — Mazda Sabouri
(74) *Attorney, Agent, or Firm* — Staas & Halsey LLP

(57) ABSTRACT

Embodiments of the present invention provide a cell handover method, a base station and a system, which relate to the field of wireless communications technologies. The method includes: determining, by a source eNB according to uplink RSRP of a UE in a serving cell and a target cell, whether to hand over the UE from the serving cell to the target cell; and if yes, acquiring UE parameters including TA of the UE in the target cell, and sending UE data and the UE parameters to a target eNB, where the TA is used for uplink synchronization between the target eNB and the UE.

8 Claims, 4 Drawing Sheets

---

501 — Determine, according to uplink RSRP of a UE in a serving cell and uplink RSRP of the UE in a target cell, whether to hand over the UE from the serving cell to the target cell 502 — Acquire UE parameters including TA of the UE in the target cell if it is determined to hand over the UE from the serving cell to the target cell 503 — Send UE data and the UE parameters to a target eNB, where the TA in the UE parameters is used to implement uplink synchronization between the target eNB and the UE

(56) References Cited

U.S. PATENT DOCUMENTS

| | | |
|---|---|---|
| 2010/0157885 A1 | 6/2010 | Koyanagi et al. |
| 2011/0294508 A1 | 12/2011 | Min et al. |
| 2012/0028676 A1 | 2/2012 | He |
| 2012/0093128 A1 | 4/2012 | Song et al. |
| 2013/0070726 A1* | 3/2013 | Zhang ............... H04W 56/0045 370/331 |
| 2013/0308473 A1* | 11/2013 | Sun ....................... H04W 36/30 370/252 |
| 2014/0313969 A1* | 10/2014 | Kalhan ............. H04W 36/0072 370/312 |
| 2015/0011224 A1* | 1/2015 | Kompalli Chakravartula ........... H04W 36/0083 455/438 |
| 2015/0055630 A1 | 2/2015 | Attar et al. |
| 2015/0146686 A1* | 5/2015 | Huang .................. H04W 36/08 370/331 |
| 2015/0181492 A1* | 6/2015 | Schmidt ............... H04W 36/30 455/443 |

FOREIGN PATENT DOCUMENTS

| | | |
|---|---|---|
| EP | 2 424 302 A1 | 2/2012 |
| EP | 2 811 773 B1 | 6/2016 |
| JP | 2006-74468 | 3/2006 |
| JP | 2008-118578 | 5/2008 |
| JP | 2009-542064 | 11/2009 |
| JP | 2010-522506 | 7/2010 |
| JP | 2015-510726 | 4/2015 |
| RU | 2496265 | 6/2010 |
| WO | WO 2007/023786 A1 | 3/2007 |
| WO | 2010/121555 A1 | 10/2010 |
| WO | 2011/137561 A1 | 11/2011 |
| WO | WO 2013/113198 A1 | 8/2013 |
| WO | WO 2013/170209 A1 | 11/2013 |

OTHER PUBLICATIONS

International Search Report (PCT/ISA/210) and Written Opinion (PCT/ISA/220) dated Apr. 20, 2015 in corresponding International Patent Application No. PCT/CN2014/082068.

Extended European Search Report dated Oct. 27, 2016 in corresponding European Patent Application No. 14897189.8.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)" 3GPP TS 36.300 V12.2.0, 3GPP Partnership project, Valbonne, France, Jun. 2014, 215 pages.

Office Action, dated May 17, 2017, in Russian Application No. 2016128993 (10 pp.).

Japanese Office Action issued on Aug. 22, 2017 in corresponding Japanese Patent Application No. 2016-542724.

* cited by examiner

CELL HANDOVER METHOD, BASE STATION AND SYSTEM

CROSS-REFERENCE TO RELATED APPLICATIONS

This application is a continuation of International Patent Application No. PCT/CN2014/082068, filed on Jul. 11, 2014, which is hereby incorporated by reference in its entirety.

TECHNICAL FIELD

Embodiments of the present invention relate to the field of wireless communications technologies, and in particular, to a cell handover method, a base station and a system.

BACKGROUND

With the rapid development of wireless communications technologies, users impose a higher requirement on quality of service of mobile communications. During a process of mobile communications, a case in which user equipment (UE) moves from a cell to another cell often occurs. When the UE moves from a cell to another cell, a cell handover is required.

A method used by a related technology for the cell handover is as follows: A source evolved NodeB (eNB) of the current serving cell in which the UE is located sends measurement control information to the UE; the UE separately measures downlink reference signal received power (RSRP) of the serving cell and downlink RSRP of the target cell according to the measurement control information, and when it is determined that a difference between the downlink RSRP of the target cell and the downlink RSRP of the serving cell is less than a preset threshold, sends a measurement report to the source eNB, where the measurement report includes the downlink RSRP of the serving cell and the downlink RSRP of the target cell; the source eNB makes a handover decision according to the received measurement report, and when it is determined that a cell handover needs to be performed on the UE, sends a handover instruction to the UE; the UE performs a handover procedure according to the handover instruction; the source eNB forwards UE data to a target eNB; the UE implements uplink synchronization with the target eNB by using random access, and is handed over to the target cell corresponding to the target eNB.

In a process of implementing the present invention, at least the following problem exists in the prior art:

Because a service of the UE is interrupted for a period of time when a cell handover is performed by using a related technology, the service of the UE is affected, and efficiency of the cell handover is low.

SUMMARY

To resolve a problem in the prior art, embodiments of the present invention provide a cell handover method, a base station and a system. The technical solutions are as follows:

According to a first aspect, a source evolved NodeB is provided, where the source evolved NodeB is a base station corresponding to a serving cell in which a UE is currently located, the UE is handed over from the serving cell to a target cell, the serving cell belongs to the source eNB, the target cell belongs to a target eNB, a same physical cell identifier (PCI) is configured for the serving cell and the target cell, and the source evolved NodeB includes:

a processing unit, configured to determine, according to uplink RSRP of the UE in the serving cell and uplink RSRP of the UE in the target cell, whether to hand over the UE from the serving cell to the target cell, where the processing unit is further configured to acquire UE parameters including timing advance (TA) of the UE in the target cell when it is determined to hand over the UE from the serving cell to the target cell; and a base station interface, configured to send UE data and the UE parameters to the target eNB, where the TA in the UE parameters is used to implement uplink synchronization between the target eNB and the UE.

With reference to the first aspect, in a first possible implementation manner of the first aspect, the processing unit is further configured to determine whether to hand over the UE from the serving cell to the target cell according to a difference between the uplink RSRP of the UE in the serving cell and the uplink RSRP of the UE in the target cell.

With reference to the first aspect, in a second possible implementation manner of the first aspect, the base station interface is further configured to receive the TA of the UE in the target cell, where the TA is measured and returned by the target eNB.

With reference to any possible implementation manner of the first aspect to the second possible implementation manner of the first aspect, in a third possible implementation manner of the first aspect, the UE parameters at least include the following: paging information of the UE, a capability list of the UE, a signaling radio bearer (SRB) parameter of the UE, a data radio bearer (DRB) parameter of the UE, a Packet Data Convergence Protocol (PDCP) parameter of the UE, a Radio Link Control (RLC) parameter of the UE, a Media Access Control (MAC) parameter of the UE, encryption information of the UE, a radio network temporary identifier (RNTI) of the UE, and the TA of the UE in the target eNB.

According to a second aspect, a target evolved NodeB is provided, where the target eNB is a base station corresponding to a target cell to which a UE is handed over from a serving cell in which the UE is currently located, the serving cell belongs to a source eNB, a same PCI is configured for the serving cell and the target cell, and the target evolved NodeB includes:

a base station interface, configured to receive UE data and UE parameters including TA of the UE in the target cell that are sent by the source eNB, where the UE parameters are sent by the source eNB after it is determined, according to uplink RSRP of the UE in the target cell and uplink RSRP of the UE in the serving cell, to hand over the UE from the serving cell to the target cell; and a processing unit, configured to implement uplink synchronization with the UE according to the TA in the UE parameters.

With reference to the second aspect, in a first possible implementation manner of the second aspect, the target evolved NodeB further includes:

a network interface, configured to send, to a core network, a link switchover request that carries a cell global identifier (CGI) of the target cell and a CGI of the serving cell, so that the core network switches from a link corresponding to the serving cell to a link corresponding to the target cell according to the CGI of the target cell and the CGI of the serving cell, where different CGIs are configured for the serving cell and the target cell.

With reference to the second aspect, in a second possible implementation manner of the second aspect, the processing unit is further configured to measure the TA of the UE in the target cell; and the base station interface is further configured to send, to the source eNB, the TA that is of the UE in the target cell and is obtained by means of measurement.

With reference to any possible implementation manner of the second aspect to the second possible implementation manner of the second aspect, in a third possible implementation manner of the second aspect, the UE parameters at least include the following: paging information of the UE, a capability list of the UE, an SRB parameter of the UE, a DRB parameter of the UE, a PDCP parameter of the UE, an RLC parameter of the UE, a MAC parameter of the UE, encryption information of the UE, an RNTI of the UE, and the TA of the UE in the target eNB.

According to a third aspect, a cell handover method is provided, where the method is applied to a scenario in which: a UE is handed over from a serving cell in which the UE is currently located to a target cell, the serving cell belongs to a source eNB, the target cell belongs to a target eNB, and a same PCI is configured for the serving cell and the target cell; and the method includes:

determining, by the source eNB according to uplink RSRP of the UE in the serving cell and uplink RSRP of the UE in the target cell, whether to hand over the UE from the serving cell to the target cell;

acquiring UE parameters including TA of the UE in the target cell if it is determined to hand over the UE from the serving cell to the target cell; and sending UE data and the UE parameters to the target eNB, where the TA in the UE parameters is used to implement uplink synchronization between the target eNB and the UE.

With reference to the third aspect, in a first possible implementation manner of the third aspect, the determining, by the source eNB according to uplink RSRP of the UE in the serving cell and uplink RSRP of the UE in the target cell, whether to hand over the UE from the serving cell to the target cell includes:

determining, by the source eNB according to a difference between the uplink RSRP of the UE in the serving cell and the uplink RSRP of the UE in the target cell, whether to hand over the UE from the serving cell to the target cell.

With reference to the third aspect, in a second possible implementation manner of the third aspect, before the acquiring UE parameters including TA of the UE in the target cell, further including:

receiving the TA of the UE in the target cell, where the TA is measured and returned by the target eNB.

With reference to any possible implementation manner of the third aspect to the second possible implementation manner of the third aspect, in a third possible implementation manner of the third aspect, the UE parameters at least include the following: paging information of the UE, a capability list of the UE, an SRB parameter of the UE, a DRB parameter of the UE, a PDCP parameter of the UE, an RLC parameter of the UE, a MAC parameter of the UE, encryption information of the UE, a radio network temporary identifier RNTI of the UE, and the TA of the UE in the target cell.

According to a fourth aspect, a cell handover method is provided, where the method is applied to a scenario in which: a UE is handed over from a serving cell in which the UE is currently located to a target cell, the serving cell belongs to a source eNB, the target cell belongs to a target eNB, and a same PCI is configured for the serving cell and the target cell; and the method includes:

receiving UE data and UE parameters including TA of the UE in the target cell that are sent by the source eNB, where the UE parameters are sent by the source eNB after it is determined, according to uplink RSRP of the UE in the target cell and uplink RSRP of the UE in the serving cell, to hand over the UE from the serving cell to the target cell; and implementing uplink synchronization with the UE according to the TA in the UE parameters.

With reference to the fourth aspect, in a first possible implementation manner of the fourth aspect, after the implementing uplink synchronization with the UE according to the TA in the UE parameters, further including:

sending, to a core network, a link switchover request that carries a CGI of the target cell and a CGI of the serving cell, so that the core network switches from a link corresponding to the serving cell to a link corresponding to the target cell according to the CGI of the target cell and the CGI of the serving cell, where different CGIs are configured for the serving cell and the target cell.

With reference to the fourth aspect, in a second possible implementation manner of the fourth aspect, before the receiving UE data and UE parameters including TA of the UE in the target cell that are sent by the source eNB, further including:

measuring the TA of the UE in the target cell; and sending, to the source eNB, the TA that is of the UE in the target cell and is obtained by means of measurement.

With reference to any possible implementation manner of the fourth aspect to the second possible implementation manner of the fourth aspect, in a third possible implementation manner of the fourth aspect, the UE parameters at least include the following: paging information of the UE, a capability list of the UE, an SRB parameter of the UE, a DRB parameter of the UE, a PDCP parameter of the UE, an RLC parameter of the UE, a MAC parameter of the UE, encryption information of the UE, an RNTI of the UE, and the TA of the UE in the target eNB.

According to a fifth aspect, a cell handover system is provided, where the system includes a source eNB and a target eNB; where the source eNB is the source eNB according to the foregoing first aspect; and the target eNB is the target eNB according to the foregoing second aspect.

Beneficial effects of the technical solutions provided in the embodiments of the present invention are as follows:

After it is determined, according to uplink RSRP of a UE in a serving cell and uplink RSRP of the UE in a target cell, to handover the UE from the serving cell to the target cell, a target eNB implements uplink synchronization with the UE according to TA in UE parameters sent by a source eNB, so as to implement an operation of a handover from the serving cell to the target cell while the UE is unaware of the handover. Because the UE does not need to participate in a handover process, time for the cell handover is reduced; further, service interruptions caused by the cell handover are reduced, improving efficiency of the cell handover.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
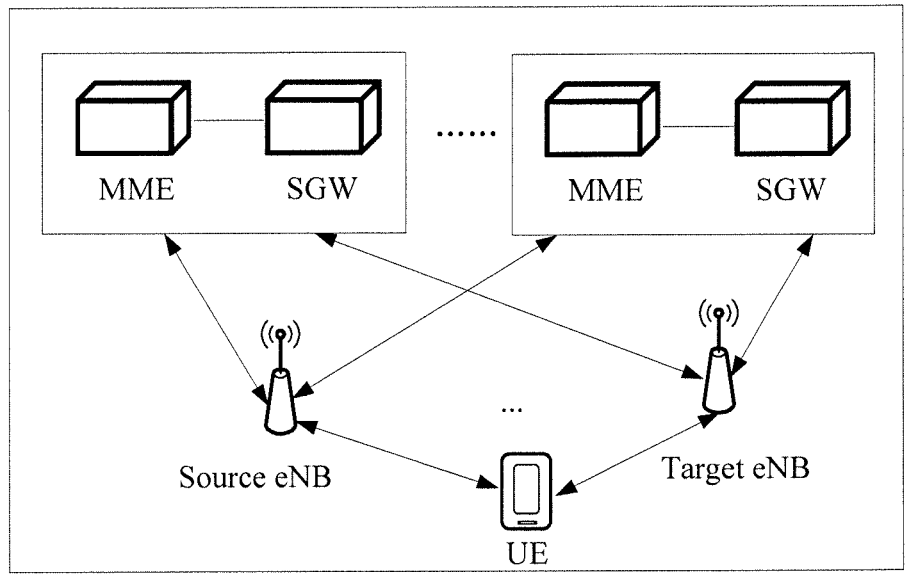
FIG. 1 is a schematic diagram of a network architecture involving a cell handover method according to an embodiment of the present invention.

As shown in FIG. 1, FIG. 1 shows a schematic diagram of a network architecture involving a cell handover method according to an embodiment of the present invention. The schematic diagram of the network architecture is a typical Long Term Evolution (LTE) system and a UE implements wireless communications by accessing the LTE system. The LTE system includes at least one eNB, at least one mobility management entity (MME), at least one serving gateway (SGW), or the like. The MME and the SGW are integral parts of a core network of the LTE.

Figure 2:
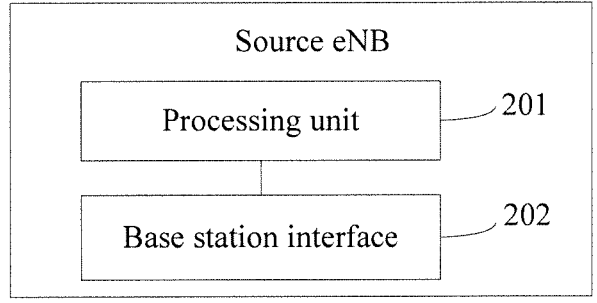
FIG. 2 is a schematic structural diagram of a source eNB according to another embodiment of the present invention.

In addition, different eNBs cover different cells, that is, different eNBs are corresponding to different cells. Each eNB processes a service for a UE within a range of a cell covered by the eNB. In a process of mobile communications, a case in which a UE moves from a cell to another cell often occurs. When the UE moves from a cell to another cell, a cell handover needs to be performed. In the embodiments of the present invention, a cell in which the UE is currently located is defined as a serving cell, and a cell to which the UE is handed over is defined as a target cell. The serving cell belongs to a source eNB, and the target cell belongs to a target eNB. With reference to the foregoing implementation environment, for details about the cell handover method, refer to the following embodiments:

FIG. 2 is a schematic structural diagram of a source eNB according to an exemplary embodiment. The source eNB is configured to perform a function performed by a source eNB in a cell handover method provided in any one of embodiments shown in the following FIG. 5 to FIG. 7. The cell handover method is applied to a scenario in which: a UE is handed over from a serving cell in which the UE is currently located to a target cell, the serving cell belongs to the source eNB, the target cell belongs to a target eNB, and a same PCI is configured for the serving cell and the target cell. Referring to FIG. 2, the source eNB includes a processing unit 201 and a base station interface 202.

The processing unit 201 is configured to determine, according to uplink RSRP of the UE in the serving cell and uplink RSRP of the UE in the target cell, whether to hand over the UE from the serving cell to the target cell.

The processing unit 201 is further configured to acquire UE parameters including TA of the UE in the target cell when it is determined to hand over the UE from the serving cell to the target cell.

The base station interface 202 is configured to send UE data and the UE parameters to the target eNB, where the TA in the UE parameters is used to implement uplink synchronization between the target eNB and the UE.

Optionally, the processing unit 201 is further configured to determine whether to hand over the UE from the serving cell to the target cell according to a difference between the uplink RSRP of the UE in the serving cell and the uplink RSRP of the UE in the target cell.

Optionally, the base station interface 202 is further configured to receive the TA of the UE in the target cell, where the TA is measured and returned by the target eNB.

Optionally, the UE parameters at least include the following: paging information of the UE, a capability list of the UE, a signaling radio bearer SRB parameter of the UE, a DRB parameter of the UE, a PDCP parameter of the UE, an RLC parameter of the UE, a MAC parameter of the UE, encryption information of the UE, an RNTI of the UE, and the TA of the UE in the target cell.

There may be many types of specific structures of the processing unit 201 in this embodiment of the present invention. For example, the processing unit 201 may be a general purpose processor, a dedicated processor, a processing circuit, or the like, which is not specifically limited in this embodiment of the present invention.

In addition, a specific structure of the base station interface 202 is also not limited in this embodiment of the present invention. During specific implementation, the base station interface 202 includes but is not limited to an X2 interface, and the like.

According to the source eNB provided in this embodiment of the present invention, after it is determined, according to uplink RSRP of a UE in a serving cell and uplink RSRP of the UE in a target cell, to hand over the UE from the serving cell to the target cell, a target eNB implements uplink synchronization with the UE according to TA in UE parameters sent by the source eNB, so as to implement an operation of a handover from the serving cell to the target cell while the UE is unaware of the handover. Because the UE does not need to participate in a handover process, time for the cell handover is reduced; further, service interruptions caused by the cell handover are reduced, improving efficiency of the cell handover.

Figure 3:
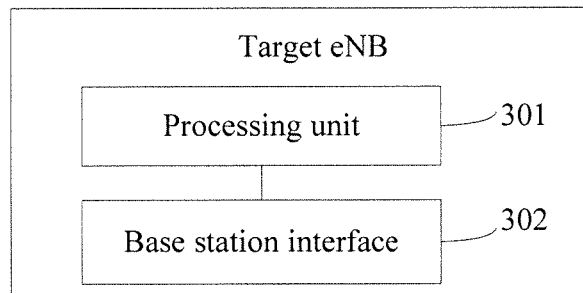
FIG. 3 is a schematic structural diagram of a target eNB according to another embodiment of the present invention.

FIG. 3 is a schematic structural diagram of a target eNB according to an exemplary embodiment. The target eNB is configured to perform a function performed by a target eNB in a cell handover method provided in any one of embodiments shown in the following FIG. 5 to FIG. 7. The cell handover method is applied to a scenario in which: a UE is handed over from a serving cell in which the UE is currently located to a target cell, the serving cell belongs to a source eNB, the target cell belongs to the target eNB, and a same PCI is configured for the serving cell and the target cell. Referring to FIG. 3, the target eNB includes a processing unit 301 and a base station interface 302.

The base station interface 302 is configured to receive UE data and UE parameters including TA of the UE in the target cell that are sent by the source eNB, where the UE parameters are sent by the source eNB after it is determined, according to uplink RSRP of the UE in the target cell and uplink RSRP of the UE in the serving cell, to hand over the UE from the serving cell to the target cell.

The processing unit 301 is configured to implement uplink synchronization with the UE according to the TA in the UE parameters.

Figure 4:
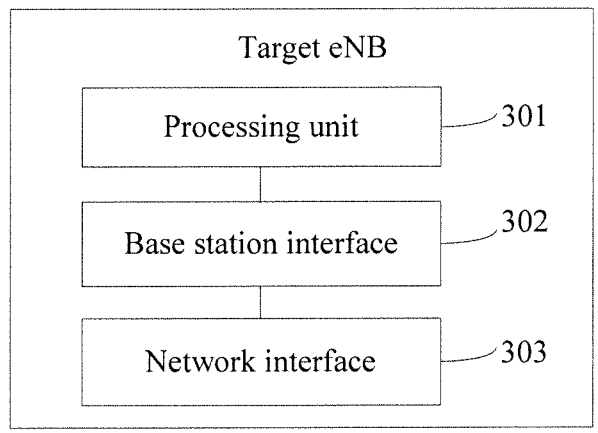
FIG. 4 is a schematic structural diagram of a target eNB according to another embodiment of the present invention.

Optionally, referring to FIG. 4, the target evolved NodeB further includes:

a network interface 303, configured to send, to a core network, a link switchover request that carries a CGI of the target cell and a CGI of the serving cell, so that the core network switches from a link corresponding to the serving cell to a link corresponding to the target cell according to the CGI of the target cell and the CGI of the serving cell, where different CGIs are configured for the serving cell and the target cell.

Optionally, the processing unit 301 is further configured to measure the TA of the UE in the target cell; and the base station interface 302 is further configured to send, to the source eNB, the TA that is of the UE in the target cell and is obtained by means of measurement.

Optionally, the UE parameters at least include the following: paging information of the UE, a capability list of the UE, a signaling radio bearer SRB parameter of the UE, a DRB parameter of the UE, a PDCP parameter of the UE, an RLC parameter of the UE, a MAC parameter of the UE, encryption information of the UE, an RNTI of the UE, and the TA of the UE in the target eNB.

There may be many types of specific structures of the processing unit 301 in this embodiment of the present invention. For example, the processing unit 301 may be a general purpose processor, a dedicated processor, a processing circuit, or the like, which is not specifically limited in this embodiment of the present invention.

In addition, specific structures of the base station interface 302 and the network interface 303 are also not limited in this embodiment of the present invention. During specific implementation, the base station interface 302 includes but is not limited to an X2 interface, and the network interface 303 includes but is not limited to an S1 interface, and the like.

According to the target eNB provided in this embodiment of the present invention, after UE data and UE parameters including TA of a UE in a target cell that are sent by a source eNB after it is determined, according to uplink RSRP of the UE in a serving cell and uplink RSRP of the UE in the target cell, to hand over the UE from the serving cell to the target cell are received, uplink synchronization with the UE is implemented according to the TA in the UE parameters, so as to implement an operation of a handover from the serving cell to the target cell while the UE is unaware of the handover. Because the UE does not need to participate in a handover process, time for the cell handover is reduced; further, service interruptions caused by the cell handover are reduced, improving efficiency of the cell handover.

Figure 5:
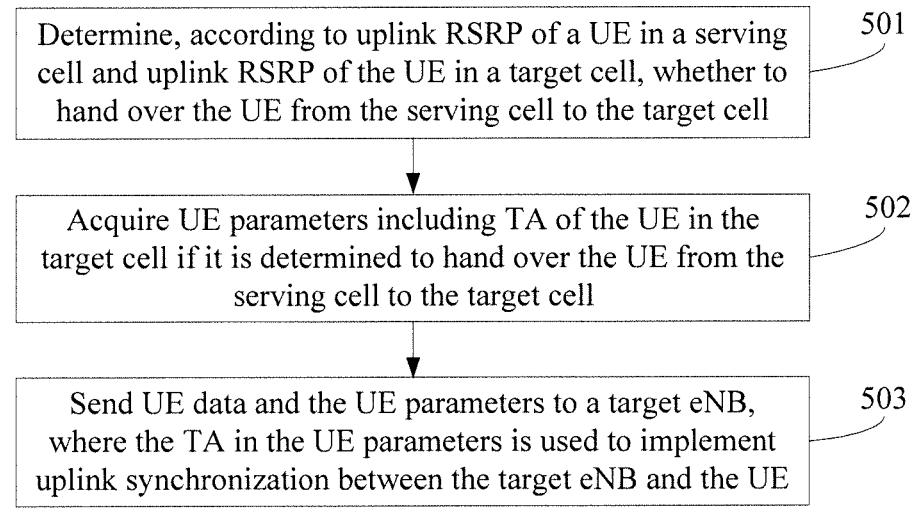
FIG. 5 is a flowchart of a cell handover method according to another embodiment of the present invention.

FIG. 5 is a flowchart of a cell handover method according to an exemplary embodiment. The method provided in this embodiment of the present invention is applied to a scenario in which: a UE is handed over from a serving cell in which the UE is currently located to a target cell, the serving cell belongs to a source eNB, the target cell belongs to a target eNB, and a same PCI is configured for the serving cell and the target cell. A perspective of performing, by the source eNB, the method provided in this embodiment of the present invention is used as an example; referring to FIG. 5, a procedure of the method provided this embodiment of the present invention includes:

501. Determine, according to uplink RSRP of the UE in the serving cell and uplink RSRP of the UE in the target cell, whether to hand over the UE from the serving cell to the target cell.

Optionally, the determining, according to uplink RSRP of the UE in the serving cell and uplink RSRP of the UE in the target cell, whether to hand over the UE from the serving cell to the target cell includes:

determining, according to a difference between the uplink RSRP of the UE in the serving cell and the uplink RSRP of the UE in the target cell, whether to hand over the UE from the serving cell to the target cell.

502. Acquire UE parameters including TA of the UE in the target cell if it is determined to hand over the UE from the serving cell to the target cell.

Optionally, before the acquiring UE parameters including TA of the UE in the target cell, the method further includes:

receiving the TA of the UE in the target cell, where the TA is measured and returned by the target eNB.

503. Send UE data and the UE parameters to the target eNB, where the TA in the UE parameters is used to implement uplink synchronization between the target eNB and the UE.

Optionally, the UE parameters at least include the following: paging information of the UE, a capability list of the UE, an SRB parameter of the UE, a DRB parameter of the UE, a PDCP parameter of the UE, an RLC parameter of the UE, a MAC parameter of the UE, encryption information of the UE, an RNTI of the UE, and the TA of the UE in the target cell.

According to the method provided in this embodiment of the present invention, after a source eNB determines, according to uplink RSRP of a UE in a serving cell and uplink RSRP of the UE in a target cell, to hand over the UE from the serving cell to the target cell, a target eNB implements uplink synchronization with the UE according to TA in UE parameters sent by the source eNB, so as to implement an operation of a handover from the serving cell to the target cell while the UE is unaware of the handover. Because the UE does not need to participate in a handover process, time for the cell handover is reduced; further, service interruptions caused by the cell handover are reduced, improving efficiency of the cell handover.

Figure 6:
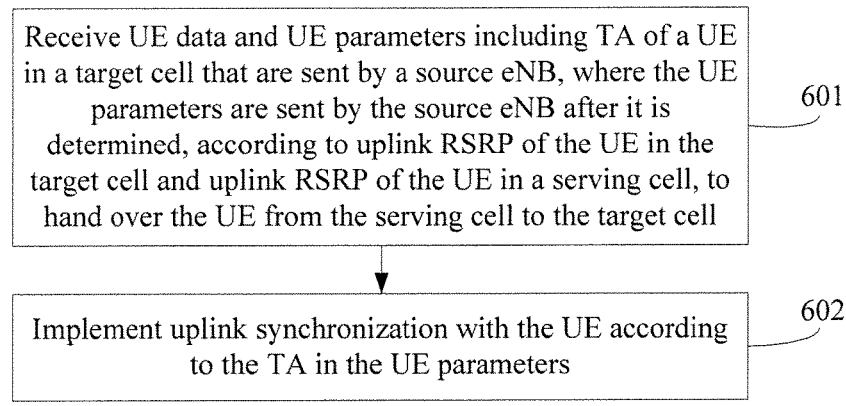
FIG. 6 is a flowchart of a cell handover method according to another embodiment of the present invention.

FIG. 6 is a flowchart of a cell handover method according to an exemplary embodiment. The method provided in this embodiment of the present invention is applied to a scenario in which: a UE is handed over from a serving cell in which the UE is currently located to a target cell, the serving cell belongs to a source eNB, the target cell belongs to a target eNB, and a same PCI is configured for the serving cell and the target cell. A perspective of performing, by the target eNB, the method provided in this embodiment of the present invention is used as an example; referring to FIG. 6, a procedure of the method provided this embodiment of the present invention includes:

601. Receive UE data and UE parameters including TA of the UE in the target cell that are sent by the source eNB, where the UE parameters are sent by the source eNB after it is determined, according to uplink RSRP of the UE in the target cell and uplink RSRP of the UE in the serving cell, to hand over the UE from the serving cell to the target cell.

Optionally, before the receiving UE data and UE parameters including TA of the UE in the target cell that are sent by the source eNB, the method further includes:

measuring the TA of the UE in the target cell; and sending, to the source eNB, the TA that is of the UE in the target cell and is obtained by means of measurement.

602. Implement uplink synchronization with the UE according to the TA in the UE parameters.

Optionally, after the implementing uplink synchronization with the UE according to the TA in the UE parameters, the method further includes:

sending, to a core network, a link switchover request that carries a CGI of the target cell and a CGI of the serving cell, so that the core network switches from a link corresponding to the serving cell to a link corresponding to the target cell according to the CGI of the target cell and the CGI of the serving cell, where different CGIs are configured for the serving cell and the target cell.

Optionally, before the receiving UE data and UE parameters including TA of the UE in the target cell that are sent by the source eNB, the method further includes:

measuring the TA of the UE in the target cell; and
sending, to the source eNB, the TA that is of the UE in the target cell and is obtained by means of measurement.

Optionally, the UE parameters at least include the following: paging information of the UE, a capability list of the UE, an SRB parameter of the UE, a DRB parameter of the UE, a PDCP parameter of the UE, an RLC parameter of the UE, a MAC parameter of the UE, encryption information of the UE, an RNTI of the UE, and the TA of the UE in the target eNB.

According to the method provided in this embodiment of the present invention, UE data and UE parameters including TA of a UE in a target cell that are sent by a source eNB after it is determined, according to uplink RSRP of the UE in a serving cell and uplink RSRP of the UE in the target cell, to hand over the UE from the serving cell to the target cell are received, and uplink synchronization with the UE is implemented according to the TA in the UE parameters, so as to implement an operation of a handover from the serving cell to the target cell while the UE is unaware of the handover. Because the UE does not need to participate in a handover process, time for the cell handover is reduced; further, service interruptions caused by the cell handover are reduced, improving efficiency of the cell handover.

Figure 7:
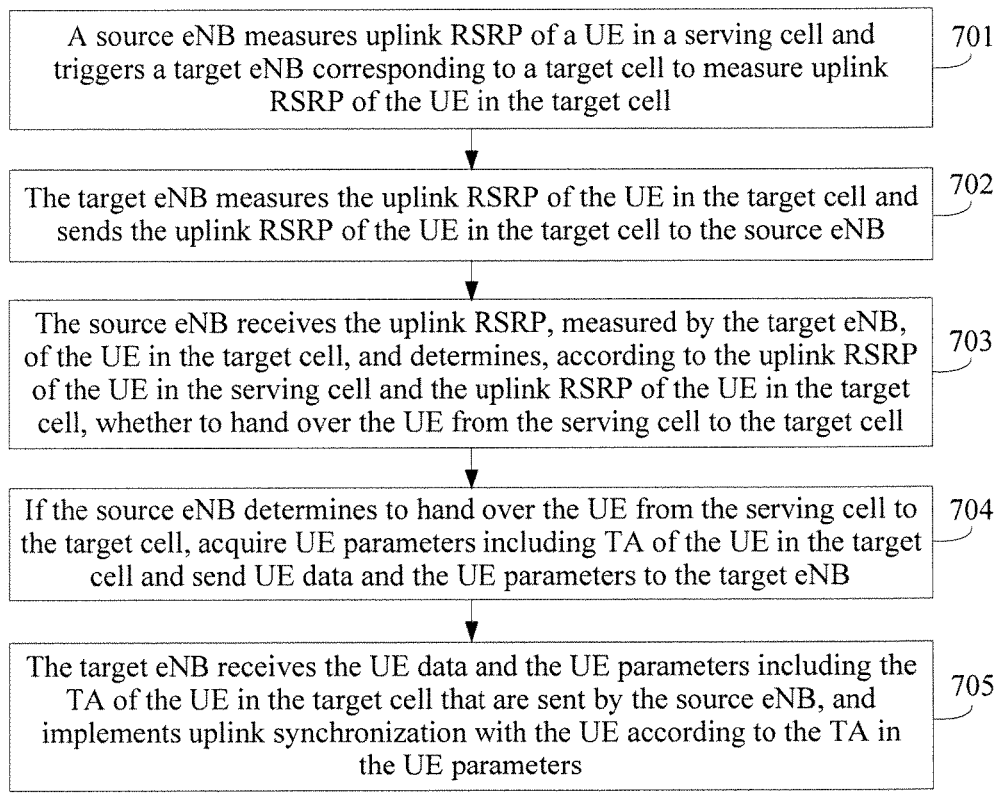
FIG. 7 is a flowchart of a cell handover method according to another embodiment of the present invention.

FIG. 7 is a flowchart of a cell handover method according to an exemplary embodiment. The method provided in this embodiment of the present invention is applied to a scenario in which: a UE is handed over from a serving cell in which the UE is currently located to a target cell, the serving cell belongs to a source eNB, the target cell belongs to a target eNB, and a same PCI is configured for the serving cell and the target cell. A perspective of interacting, by the source eNB and the target eNB, with each other to implement the method provided in this embodiment of the present invention is used as an example; referring to FIG. 7, a procedure of the method provided this embodiment of the present invention includes:

701. The source eNB measures uplink RSRP of the UE in the serving cell and triggers the target eNB corresponding to the target cell to measure uplink RSRP of the UE in the target cell.

RSRP is a key parameter representing wireless signal strength in an LTE network; therefore, it is determined, usually according to RSRP of the UE in the serving cell and RSRP of the UE in the target cell, whether to perform a cell handover on the UE. In addition, because the same PCI is configured for the serving cell corresponding to the source eNB and the target cell corresponding to the target eNB in this embodiment of the present invention, the UE cannot be aware of a change of a cell in a process of mobile communications, so that the UE cannot, either, measure downlink RSRP of the UE in the serving cell and downlink RSRP of the UE in the target cell. For this case, in the method provided in this embodiment of the present invention, the source eNB measures the uplink RSRP of the UE in the serving cell to determine strength of a signal of the UE in the serving cell. In addition, in order that the source eNB may subsequently determine whether the UE needs to be handed over from the serving cell to the target cell, when the UE is in the serving cell, the source eNB triggers the target eNB to measure the uplink RSRP of the UE in the target cell.

A manner in which the source eNB measures the uplink RSRP of the UE in the serving cell is not specifically limited in this embodiment of the present invention. During specific implementation, the uplink RSRP of the UE in the serving cell may be measured in real time, or the uplink RSRP of the UE in the serving cell may be measured periodically, or the like. However, in order to determine, in a timely manner, whether a cell handover needs to be performed on the UE, a manner of measuring the uplink RSRP of the UE in the serving cell in real time may be used.

There may be many manners in which the source eNB triggers the target eNB to measure the uplink RSRP of the UE in the target cell. During specific implementation, the manners include but are not limited to: a manner of sending a measurement instruction to the target eNB when it is detected that the UE enters the serving cell. A manner in which the source eNB detects that the UE enters the serving cell is not limited in this embodiment of the present invention; during specific implementation, the manner includes but is not limited to: detecting whether a corresponding resource has been allocated to the UE, or detecting whether the UE has occupied a resource pre-allocated to the UE.

702. The target eNB measures the uplink RSRP of the UE in the target cell and sends the uplink RSRP of the UE in the target cell to the source eNB.

A manner in which the target eNB measures the uplink RSRP of the UE in the target cell is not specifically limited in this embodiment of the present invention. During specific implementation, the target eNB starts measuring the uplink RSRP of the UE in the target cell upon triggering by the source eNB.

In addition, in order that the source eNB can subsequently determine whether the UE needs to be handed over from the serving cell to the target cell, the target eNB sends the uplink RSRP of the UE in the target cell to the source eNB. Because the sending the uplink RSRP of the UE in the target cell is performed between the source eNB and the target eNB, the sending, by the target eNB, the uplink RSRP of the UE in the target cell to the source eNB may be implemented by using a preset X2 interface between the source eNB and the target eNB.

It should be noted that because there may be multiple target cells adjacent to a serving cell and each neighboring cell may be used as a target cell, the source eNB may simultaneously trigger eNBs corresponding to all neighboring cells to separately measure uplink RSRP of the UE in cells corresponding to the eNBs, and control all the neighboring cells to report the uplink RSRP, obtained by means of measurement, of the UE in the cells corresponding to the eNBs. The source eNB selects an optimal cell as the target cell in this embodiment of the present invention according to the uplink RSRP that is of the UE in the cells corresponding to the eNBs and is reported by the eNBs corresponding to the neighboring cells. For example, the source eNB may select, from all the neighboring cells, a cell in which uplink RSRP of the UE is the largest as the target cell.

A manner in which the source eNB simultaneously triggers the eNBs corresponding to all the neighboring cells to separately measure the uplink RSRP of the UE in the cells corresponding to the eNBs is not specifically limited in this embodiment of the present invention; during specific implementation, the manner includes but is not limited to: acquiring identifiers of the eNBs corresponding to all the neighboring cells and sending a measurement instruction to the eNBs corresponding to all the neighboring cells, so that the eNBs corresponding to the neighboring cells measure, according to the measurement instruction, the uplink RSRP of the UE in the cells corresponding to the eNBs. A manner in which the source eNB acquires the identifiers of the eNBs corresponding to all the neighboring cells includes but is not limited to: prestoring a mapping relationship between all the neighboring cells and the identifiers of the eNBs corresponding to all the neighboring cells. Therefore, the identifiers of the eNBs corresponding to all the neighboring cells may be acquired from the prestored mapping relationship between all the neighboring cells and the identifiers of the eNBs corresponding to all the neighboring cells. The mapping relationship, prestored by the source eNB, between all the neighboring cells and the identifiers of the eNBs corresponding to all the neighboring cells includes but is not limited to the mapping relationship shown in Table 1:

TABLE 1

| Neighboring cell | Identifier of an eNB |
| --- | --- |
| Neighboring cell 1 | eNB1 |
| Neighboring cell 2 | eNB2 |

703. The source eNB receives the uplink RSRP, measured by the target eNB, of the UE in the target cell, and determines, according to the uplink RSRP of the UE in the serving cell and the uplink RSRP of the UE in the target cell, whether to hand over the UE from the serving cell to the target cell.

A manner in which the source eNB receives the uplink RSRP, measured by the target eNB, of the UE in the target cell is not specifically limited in this embodiment of the present invention.

In addition, there may be many manners in which the source eNB determines, according to the uplink RSRP of the UE in the serving cell and the uplink RSRP of the UE in the target cell, whether to hand over the UE from the serving cell to the target cell. During specific implementation, the manners include but are not limited to that: the source eNB determines, according to a difference between the uplink RSRP of the UE in the serving cell and the uplink RSRP of the UE in the target cell, whether to hand over the UE from the serving cell to the target cell. During specific implementation, the manners include but are not limited to that: the source eNB determines that the UE needs to be handed over from the serving cell to the target cell when the source eNB determines that the difference between the uplink RSRP of the UE in the serving cell and the uplink RSRP of the UE in the target cell is less than a preset threshold. A value of the preset threshold may be configured by each vendor, which is not specifically limited in this embodiment of the present invention.

704. If the source eNB determines to hand over the UE from the serving cell to the target cell, acquire UE parameters including TA of the UE in the target cell and send UE data and the UE parameters to the target eNB.

In order to ensure that uplink synchronization between the target eNB and the UE can be implemented after the UE is subsequently handed over from the serving cell to the target cell, the source eNB first needs to acquire the TA of the UE in the target cell. A manner in which the source eNB acquires the TA of the UE in the target cell includes but is not limited to: the source eNB instructs the target eNB to simultaneously measure the TA of the UE in the target cell when triggering the target eNB to measure the uplink RSRP of the UE in the target cell, and instructs the target eNB to simultaneously sends the TA, measured by the target eNB, of the UE in the target cell when the target eNB sends the measured uplink RSRP of the UE in the target cell to the source eNB. Therefore, a manner in which the source eNB acquires the TA of the UE in the target cell may be: triggering the target eNB to measure the TA of the UE in the target cell, and controlling the target eNB to send the measured TA of the UE in the target cell to the source eNB, where the source eNB acquires the TA of the UE in the target cell by receiving the TA of the UE in the target cell, where the TA is measured and returned by the target eNB. Certainly, the source eNB may also acquire the TA of the UE in the target cell in another manner, which is not specifically limited in this embodiment of the present invention.

In addition, in order that the target eNB can properly process a service for the UE the UE is handed over from the serving cell to the target cell, the source eNB needs to send the UE data and the UE parameters to the target eNB. Therefore, the source eNB needs to send the UE data and the UE parameters to the target eNB.

Specific content of the UE data is not limited in this embodiment of the present invention. During specific implementation, the UE data may be data that is being processed by the source eNB and related to the service currently processed by the UE, or may be other data related to the UE, for example, a receiver window size, or a QoS class identifier (QCI).

In addition, because a same PCI is configured for the serving cell and the target cell in this embodiment of the present invention, the source eNB interacts with the target eNB to implement a handover of the UE from the source cell to the target cell while the UE is unaware of the handover. Because the UE does not need to participate in a cell handover process, the target eNB cannot configure, by interacting with the UE, related UE parameters of the UE at an access layer; therefore, the source eNB is required to send the UE parameters to the target eNB.

Likewise, specific content of the UE parameters is not limited in this embodiment of the present invention; during specific implementation, the UE parameters at least include the following: paging information of the UE, a capability list of the UE, an SRB parameter of the UE, a DRB parameter of the UE, a PDCP parameter of the UE, an RLC parameter of the UE, a MAC parameter of the UE, encryption information of the UE, an RNTI of the UE, the TA of the UE in the target cell, and the like.

Optionally, if the source eNB determines to hand over the UE from the serving cell to the target cell, in order that the target eNB can prepare for this handover or in order to ensure that the target eNB can help implement this handover process, before acquiring the UE parameters including the TA of the UE in the target cell, the source eNB may further send a handover request message to the target eNB, and transfer, by using the handover request message, necessary information used by the target eNB to prepare for the handover. After receiving the handover request message, to ensure a success rate of the handover, the target eNB may make an access admission decision according to the handover request message to decide whether a resource can be allocated, and allocates a resource in the target eNB to the UE after the decision succeeds. In addition, after the decision succeeds, the target eNB replies a handover acknowledgment message to the source eNB, so that the source eNB learns that the handover to the target eNB can be performed.

705. The target eNB receives the UE data and the UE parameters including the TA of the UE in the target cell that are sent by the source eNB, and implements uplink synchronization with the UE according to the TA in the UE parameters.

A manner in which the target eNB receives the UE data and the UE parameters including the TA of the UE in the target cell that are sent by the source eNB is not specifically limited in this embodiment of the present invention. A manner in which the target eNB implements uplink synchronization with the UE according to the TA in the UE parameters is not specifically limited in this embodiment of the present invention either; during specific implementation, the manner includes but is not limited to that: the target eNB sends the TA in the UE parameters to the UE, so that the UE implements uplink synchronization with the target eNB according to the TA.

It should be noted that if the handover between the serving cell and the target cell is an intra-base station handover, a process of the cell handover is implemented by using the foregoing step 701 to step 705. For the intra-base station handover, the source eNB and the target eNB that perform the cell handover methods provided in the embodiments shown in the foregoing FIG. 5 to FIG. 7 may be a same eNB. That is, one eNB may be simultaneously corresponding to a serving cell and a target cell, and implement a cell handover by using functions performed by the source eNB and the target eNB in the embodiments shown in the foregoing FIG. 5 to FIG. 7.

However, if the handover between the serving cell and the target cell is an inter-base station handover, because links between different eNBs and a core network are different, for the inter-base station handover, the following step further needs to be performed:

The target eNB sends a link switchover request that carries a CGI of the target cell and a CGI of the serving cell to the core network, so that the core network switches from a link corresponding to the serving cell to a link corresponding to the target cell according to the CGI of the target cell and the CGI of the serving cell. The core network may uniquely identify each cell according to a CGI, and different CGIs are configured for the serving cell and the target cell.

A manner in which the target eNB sends the link switchover request that carries the CGI of the target cell and the CGI of the serving cell to the core network is not specifically limited in this embodiment of the present invention. A manner in which the core network switches from the link corresponding to the serving cell to the link corresponding to the target cell according to the CGI of the target cell and the CGI of the serving cell is not specifically limited in this embodiment of the present invention either. During specific implementation, with reference to the schematic diagram of the network architecture shown in FIG. 1 and content of 10.1.2 in the protocol TS36.300, that the target eNB interacts with the core network to implement a switchover from the link corresponding to the serving cell to the link corresponding to the target cell includes the following steps but is not limited to implementation by using the following steps:

Step 1: The target eNB sends a path switchover message to an MME to notify that a cell of the UE has been changed.

Step 2: The MME sends a user plane update request message to an SGW.

Step 3: The SGW switches a link of the UE to a link of the target cell corresponding to the target eNB according to the user plane update request message, sends a termination flag over a link corresponding to the serving cell corresponding to the source eNB, and releases a link resource allocated to the source eNB.

Step 4: The SGW sends a user plane update response message to the MME.

Step 5: The MME sends a path switchover acknowledge message to the target eNB.

Step 6: After receiving the path switchover acknowledge message sent by the MME, the target eNB notifies, by using a UE context release message, the source eNB that a handover is successful, and triggers the source eNB to release a resource of the source eNB.

Step 7: After receiving the UE context release message, the source eNB releases a related resource of a control plane, and continues to forward the UE data to the target eNB until the UE data is all forwarded.

It should be noted that the serving cell and the target cell in the cell handover method provided in this embodiment of the present invention may be single frequency network (SFN) cells, where multiple physical cells may be combined into one SFN cell.

A process of handing over the UE from the serving cell to the target cell while the UE is unaware of the handover can be implemented in this embodiment of the present invention, without participation of the UE, by using the foregoing steps when a same PCI is configured for the serving cell and the target cell. The cell handover method provided in this embodiment of the present invention may be applied to many scenarios.

For example, the method may be applied to a line along high-speed railway. Specifically, both a same PCI and a common channel may be configured for consecutive SFN cells in the line along the high-speed railway, and different CGIs are configured for the SFN cells. Therefore, when the UE is on the high-speed railway, a fast handover between cells may be implemented, by using the method provided in this embodiment of the present invention, while the UE is unaware of the handover, so that a service of the UE is not affected, and good operation experience is brought to a user.

In addition, this embodiment of the present invention may also be applied to an indoor coverage solution. Specifically, for a high-rise building, multiple physical cells corresponding to each floor of the building are combined into one SFN cell, a same PCI and a common channel are configured for the SFN cell of each floor, and different CGIs are configured for the SFN cells. Therefore, when the UE moves from top to bottom or from bottom to top in the high-rise building, a fast handover between cells can be implemented by using the cell handover method provided in this embodiment of the present invention, so that the service of the UE is not affected.

Certainly, in the cell handover method provided in this embodiment of the present invention, a same PCI and a common channel may also be configured for two adjacent cells, where different CGIs are configured for the cells, so that when the UE moves between the two adjacent cells for which the same PCI is configured, a fast handover can be implemented without affecting a service, by using the cell handover method provided in this embodiment of the present invention.

According to the method provided in this embodiment of the present invention, after it is determined, according to uplink RSRP of a UE in a serving cell and uplink RSRP of the UE in a target cell, to hand over the UE from the serving cell to the target cell, a source eNB sends UE data and UE parameters including TA of the UE in the target cell to a target eNB, and the target eNB implements uplink synchronization with the UE according to the TA in the UE parameters, so as to implement an operation of a handover from the serving cell to the target cell while the UE is unaware of the handover. Because the UE does not need to participate in a handover process, time for the cell handover is reduced; further, service interruptions caused by the cell handover are reduced, improving efficiency of the cell handover.

Figure 8:
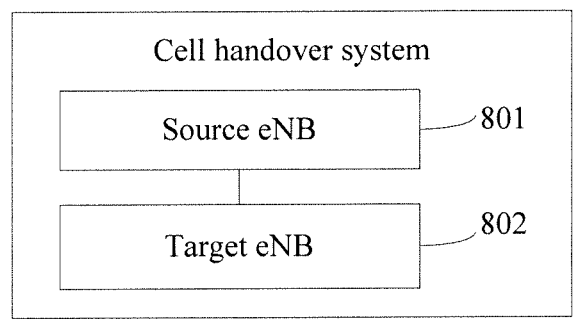
FIG. 8 is a schematic structural diagram of a cell handover system according to another embodiment of the present invention.

FIG. 8 is a schematic structural diagram of a cell handover system according to an exemplary embodiment. Referring to FIG. 8, the system includes a source eNB 801 and a target eNB 802.

The source eNB 801 is the source eNB corresponding to the embodiment shown in the foregoing FIG. 2. For details, refer to specific content of the embodiment shown in the foregoing FIG. 2, and details are not described herein again.

The target eNB 802 is the target eNB corresponding to the embodiment shown in the foregoing FIG. 3 or FIG. 4. For details, refer to specific content of the embodiment shown in the foregoing FIG. 3 or FIG. 4, and details are not described herein again.

According to the system provided in this embodiment of the present invention, after it is determined, according to uplink RSRP of a UE in a serving cell and uplink RSRP of the UE in a target cell, to hand over the UE from the serving cell to the target cell, a source eNB sends UE data and UE parameters including TA of the UE in the target cell to a target eNB, and the target eNB implements uplink synchronization with the UE according to the TA in the UE parameters, so as to implement an operation of a handover from the serving cell to the target cell while the UE is unaware of the handover. Because the UE does not need to participate in a handover process, time for the cell handover is reduced; further, service interruptions caused by the cell handover are reduced, improving efficiency of the cell handover.

It should be noted that: when the base station provided in the foregoing embodiment performs a cell handover, division of the foregoing functional modules is taken as an example for illustration. In actual application, the foregoing functions can be allocated to different modules and implemented according to a requirement, that is, an inner structure of a device is divided into different function modules to implement all or some of the functions described above. In addition, the base station and the system, and the cell handover method that are provided in the foregoing embodiments belong to a same idea. For a specific implementation process, refer to the method embodiments, and details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A source evolved NodeB (eNB), comprising:
   a processor, configured to determine, according to uplink reference signal received power (RSRP) of user equipment (UE) in a serving cell and uplink RSRP of the UE in a target cell, whether to hand over the UE from the serving cell to the target cell, wherein the serving cell belongs to the source eNB, the target cell belongs to a target eNB, the serving cell and the target cell are configured with a same physical cell identifier (PCI);
   the processor is further configured to acquire UE parameters when it is determined to hand over the UE from the serving cell to the target cell, wherein the UE parameters at least comprises timing advance (TA) of the UE in the target cell; and
   a base station interface, configured to send UE data and the UE parameters to the target eNB, wherein the TA in the UE parameters is used to implement uplink synchronization between the target eNB and the UE.

2. The source eNB according to claim 1, wherein the processor is configured to determine whether to hand over the UE from the serving cell to the target cell according to a difference between the uplink RSRP of the UE in the serving cell and the uplink RSRP of the UE in the target cell.

3. The source eNB according to claim 1, wherein the base station interface is configured to receive the TA of the UE in the target cell, wherein the TA is measured and returned by the target eNB.

4. The source eNB according to claim 1, wherein the UE parameters further comprise at least one of paging information of the UE, a capability list of the UE, a signaling radio bearer (SRB) parameter of the UE, a data radio bearer (DRB) parameter of the UE, a Packet Data Convergence Protocol (PDCP) parameter of the UE, a Radio Link Control (RLC) parameter of the UE, a Media Access Control (MAC) parameter of the UE, encryption information of the UE, and a radio network temporary identifier (RNTI) of the UE.

5. A cell handover method, comprising:
   determining, by a source evolved NodeB (eNB), according to uplink reference signal received power (RSRP) of user equipment (UE) in a serving cell and uplink RSRP of the UE in a target cell, whether to hand over the UE from the serving cell to the target cell, wherein the serving cell belongs to the source eNB, the target cell belongs to a target eNB, the serving cell and the target cell are configured with a same physical cell identifier (PCI);
   acquiring, by the source eNB, UE parameters if it is determined to hand over the UE from the serving cell to the target cell, wherein the UE parameters at least comprises timing advance (TA) of the UE in the target cell; and
   sending, by the source eNB, UE data and the UE parameters to the target eNB, wherein the TA in the UE parameters is used to implement uplink synchronization between the target eNB and the UE.

6. The method according to claim 5, wherein the determining, by the source eNB according to uplink RSRP of the UE in the serving cell and uplink RSRP of the UE in the target cell, whether to hand over the UE from the serving cell to the target cell comprises:
   determining, by the source eNB according to a difference between the uplink RSRP of the UE in the serving cell and the uplink RSRP of the UE in the target cell, whether to hand over the UE from the serving cell to the target cell.

7. The method according to claim 5, before the acquiring UE parameters comprising timing advance TA of the UE in the target cell, further comprising:
   receiving the TA of the UE in the target cell, where the TA is measured and returned by the target eNB.

8. The method according to claim 5, wherein the UE parameters further comprise at least one of paging information of the UE, a capability list of the UE, a signaling radio bearer (SRB) parameter of the UE, a data radio bearer (DRB) parameter of the UE, a Packet Data Convergence Protocol (PDCP) parameter of the UE, a Radio Link Control (RLC) parameter of the UE, a Media Access Control (MAC) parameter of the UE, encryption information of the UE, and a radio network temporary identifier (RNTI) of the UE.

* * * * *